(12) United States Patent
Randriamasy et al.

(10) Patent No.: US 11,886,908 B2
(45) Date of Patent: Jan. 30, 2024

(54) TRANSFORMING INTENT EXPRESSIONS INTO COMMANDS AND CONFIGURATIONS

(71) Applicant: Nokia Solutions and Networks Oy, Espoo (FI)

(72) Inventors: Sabine Randriamasy, Meudon (FR); Fred Kwasi Mawufemor Aklamanu, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 57 days.

(21) Appl. No.: 17/679,257

(22) Filed: Feb. 24, 2022

(65) Prior Publication Data

US 2022/0276892 A1    Sep. 1, 2022

(30) Foreign Application Priority Data

Feb. 26, 2021 (EP) .................................. 21159488

(51) Int. Cl.
G06F 9/44 (2018.01)
G06F 9/48 (2006.01)

(52) U.S. Cl.
CPC .................................. *G06F 9/485* (2013.01)

(58) Field of Classification Search
CPC ..................................................... G06F 9/485
USPC ....................................................... 719/320
See application file for complete search history.

(56) References Cited

U.S. PATENT DOCUMENTS 10,250,446 B2    4/2019   Prasad et al.
2016/0241436 A1   8/2016   Fourie et al.
2019/0238410 A1   8/2019   Kang et al.
2020/0313957 A1  10/2020   A et al.
2020/0374192 A1  11/2020   Leijon
2021/0192412 A1*  6/2021   Krishnaswamy .. G06Q 30/0201

FOREIGN PATENT DOCUMENTS

EP       3470983 A1    4/2019
WO    2019/113196 A1   6/2019
WO    2021/213632 A1  10/2021

OTHER PUBLICATIONS

Aklamanu et al., "Intent-based networking for OTT applications: concepts, lifecycle and challenges", Nokia, IETF 106, Nov. 21, 2019, pp. 1-27.
Beshley et al., "Dynamic Switch Migration Method Based on QoE-Aware Priority Marking for Intent-Based Networking", IEEE 15th International Conference on Advanced Trends in Radioelectronics, Telecommunications and Computer Engineering (TCSET), Feb. 25-29, 2020, pp. 864-868.
Extended European Search Report received for corresponding European Patent Application No. 21159488.2, dated Aug. 11, 2021, 7 pages.
Aklamanu et al., "Intent-Based Real-Time 5G Cloud Service Provisioning", IEEE Globecom Workshops (GC Wkshps), Dec. 9-13, 2018, 6 pages.

* cited by examiner

*Primary Examiner* — Timothy A Mudrick
(74) *Attorney, Agent, or Firm* — Nokia Technologies Oy

(57) ABSTRACT

A processing is executed with respect to a key value of a key field included in a sequence of one or more key fields expressing a received intent which is associated with a specific system. Based on a result of the processing, one or more instructions associated with the specific system are generated for one or more control functions controlling an infrastructure for carrying out the received intent.

16 Claims, 10 Drawing Sheets

| Key Field Types | Key Field Roles | KRF | KRF-ORF |
|---|---|---|---|
| Intent Action | Lifecycle Action Intent | LCAs | - Ancillary: IH-DB<br>- LCA2I Translation |
| Deploy-Intent Release-Intent | Infrastructure Update | LCA2I | - Target Function<br>- Ancillary: IH-DB |
| Intent-Name | Application Type ID | BP-DB | Ancillary: VNF Deployment Plan Computation |
| Location | Intent Deployment Parameter | Deployment Function | Ancillary: VNF Deployment Plan Computation |
| Number-Of-Devices | Intent Dimensioning Parameter | Dimensioning Function | Ancillary: VNF Deployment Plan Computation |
| QoE | Intent Dimensioning Parameter | Dimensioning Function | Ancillary: VNF Deployment Plan Computation |
| Duration | Intent Dimensioning Parameter<br>Intent Calendaring Parameter | Dimensioning Function<br>Calendaring Function | |
| Start-End-Date | Intent Calendaring Parameter | Calendaring Function | |

FIGURE 3

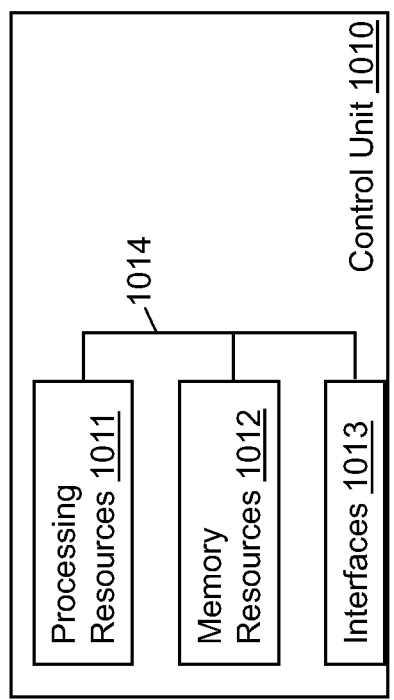

TRANSFORMING INTENT EXPRESSIONS INTO COMMANDS AND CONFIGURATIONS

TECHNICAL FIELD

At least some example embodiments relate to IoT services, cloud services and/or telecom services, and in particular to transforming intent expressions into commands and configurations to manage the one or more services.

BACKGROUND

With the rapid technology disruptions, there is a wave which brings on board millions of users, huge data bulks and more complex network infrastructures, NFV and SDN for network automation, through more programmability, flexibility and scalability. In particular, mobile networks are now geared to 5G which will support the emergence of new applications. Use case families such as eMBB, mMTC, URLLC defined in 3GPP or more specific cases are listed in GSMA such as "health and wellness monitoring" or "IoT for water metering".

Infrastructure provider market now opens to non-technical clients. clients may represent tenants, verticals, or providers selling applications to the public. In particular, clients may buy Network Slices to run Over The Top (OTT) applications. The forecasted demand increases for network services to support deployment of vertical application calls for network automation. Clients want reliable and fast deployment and operations and intent-based networking (IBN) is making it possible. IBN bridges the gap between clients and infrastructure by offering a "handle" on the network infrastructure for fast and reliable client request processing.

An intent is defined as an infrastructure-agnostic expression of an infrastructure service request, and qualified as "declarative", because it expresses WHAT is requested and not HOW the request should be fulfilled. IBN hides infrastructure complexity and confidentiality while the needed infrastructure information is exposed to clients. An intent template attempts to expose all the attributes that a client may need to describe the desired service. IBN attempts to couple intent representations with engines fulfilling them and assuring reliable intent operation.

Intents may be expressed at different network levels and with diverse technical skills, ranging from a request for the establishment of IP flows to request for the deployment of public applications.

An intent specifies a service request in terms of an action, a date, a location, a desired level of performance, and other attributes. For example, parsing a Network Slice intent results in actions on a set of VNFs that are sequenced and connected to execute a given application. These actions include for example deployment, deletion, update.

IBN is a closed loop between client request and infrastructure feedback, unlike a simple user interface that does top-down mapping to programs. It should provide system feedback such as feasibility and monitoring and maintain information on intent status and history.

An intent representation model should support all possible kinds of technology-agnostic attributes a client may need to describe its request. As per IRTF-NMRG "there is no commonly agreed definition, interface or model of intent". However, intents are to be translated in more technical models and expressions,
that provide input to functions fulfilling the intent such as orchestrators and SDN Controllers,
or that describe properties of the desired result, such as the Generic Slice Templates (GST) defined by the GSMA.

Many service models such as the GSMA-GST are technology-specific and clients often do not have the knowledge, or skills, or time or interest to provide them with values. Additionally, the GSMA-GST describes a desired state to be achieved and leave aside potential actions to be performed on the application deployment.

There is no uniform functional architecture for intent processing frameworks. Until an intent is transformed into code and machine instructions that are sent to orchestrators and SDN Controllers, the number of intermediate steps is variable. Some frameworks take full care of the instructions already at the stage of a GSMA-GST while others may keep more control on the execution and for instance choose a particular deployment algorithm, upon context. The challenge is to identify the receiving functions
that can take care of translated intents until their execution,
and that are the closest to the module receiving the client intent.

It appears that these functions are different, depending on the portion of the intent that they process.

LIST OF ABBREVIATIONS

3GPP Third Generation Partnership Project
5G Fifth Generation
ASI Application Slice Intents
BW Bandwidth
CPU Central Processing Unit
COASP Cloud OTT Application Slicing Platform
DC Data Center
DP-DB Deployment DB
eMBB enhanced MBB
GSM Global System for Mobile communications
GSMA GSM Association
GST Generic Slice Template
HTTP HyperText Transfer Protocol
IBAS Intent-Based Application Slicing
IBN Intent-Based Networking
ID Identifier
IoT Internet of Things
IP Internet Protocol
IRTF Internet Research task Force
IF Interface
IH-DB Intent History Database
IMT Intent Mapping and Translation
IM-DB Intent Mapping function and Database
JSON JavaScript Object Notation
K8S Kubernetes
KPI Key Performance Indicator
KRF Keyfield Receiving Function
LCM Life Cycle Management
MBB Mobile Broadband
MTC Machine Type Communication
mMTC massive MTC
NEST NETwork Slice Template
NFV Network Functions Virtualization
NMRG Network Management Research Group
NS Network Slice
OTT Over The Top
ONAP Open Network Automation Platform
ORF Output Receiving Function
PoC Proof of Concept
QoE Quality of Experience
RAM Random Access Memory S Storage
SDN Software-defined Networking
SDNC SDN Controller
SFG Service Function Graph
URLLC Ultra Reliable and Low Latency Communication
VNF Virtual Network Function
XML Extensible Markup Language

CITATION LIST

[1] IETF106-IRTF NMRG session 1, Nov. 21, 2019, F. Aldamanu, S. Randriamasy, "Intent-based networking for OTT applications: concepts, lifecycle and challenges", https://datatracker.ietf.org/meeting/106/materials/slides-106-nmrg-sessa-intent-based-networking-for-ott-applications-concepts-lifecycle-and-challenges-00

SUMMARY

At least some example embodiments provide for a mechanism that transforms an intent expression in one or more instructions sent to other functions or interfaces.

At least some example embodiments address at least one of the following problems:
  how to transform an intent such as a vertical Network Slicing intent in relevant commands for the infrastructure controllers such as SDNC and orchestrators;
  what information and parameters should be used to represent an intent such as an NS (Network Slice) intent at client level;
  what is a suitable method to parse and translate the intent into instructions that can be passed to functions that will ensure the intent execution;
  how to translate an incoming intent into machine instructions for infrastructure controllers;
  how to speed-up the intent execution;
  hot to manage lifecycle management of intents and related target functions.

According to at least some example embodiments, at least some of the above problems are overcome by an apparatus, a method and a non-transitory computer-readable storage medium as specified by the appended claims.

The idea can, in general, manage any process/system/service, e.g. an IoT service, network cloud service, telecom network, and/or industrial manufacturing process, and any related one or more apparatuses, servers, computers, devices, sensors, and/or valves, etc.

A slice can be, for example, a network slice that concerns the management of one or more parts of the IoT service, the network cloud service or the telecom network. In general, the slice can be one or more parts of any process/system/service, such as the industrial manufacturing process.

In the following example embodiments will be described with reference to the accompanying drawings.

BRIEF DESCRIPTION OF THE DRAWINGS

FIG. 3 shows a table illustrating an example of an intent mapping function and database (IM-DB) for key fields defined in IBAS.

FIG. 10 shows a schematic block diagram illustrating a configuration of a control unit in which at least some example embodiments are implementable.

DESCRIPTION OF THE EMBODIMENTS

Before describing at least some example embodiments, an overview of an Intent-Based slicing framework "IBAS" as described in [1] will be given by referring to FIG. 1. Further, shortcomings of IBAS as well as of transformational languages and standard Traffic Management TM Forum interfaces will be described below.

Standardization and related bodies such as the IRTF-NMRG define that an IBN architecture must support the whole lifecycle of a deployed service, including deployment and monitoring. However, most of the published representation models and processing frameworks focus on the service deployment, which is indeed a complex task, while frequent steps such as update, cancel, stop should not be neglected.

An intent is represented by a set of key fields encoding, for example: an action-type, an application-type, a number of connected devices, a deployment location, a start date, a duration and a quality of experience (QoE) level. The IBAS intent format is a sequence of so-called key fields with their key values including, for example, one or more:
  intent action [action-type]
  intent-name [application-type]
  number-of-devices [number]
  location [name-of-place]
  start-end-date [date]
  duration [time]
  QoE [string].

An example of the sequencing of IBAS Intent key values is:
  DEPLOY IoT-slice 100000 PS91 Tue, 10 Nov. 2020 08:12:31 GMT 02:00:00 Quality-silver.

Figure 1:
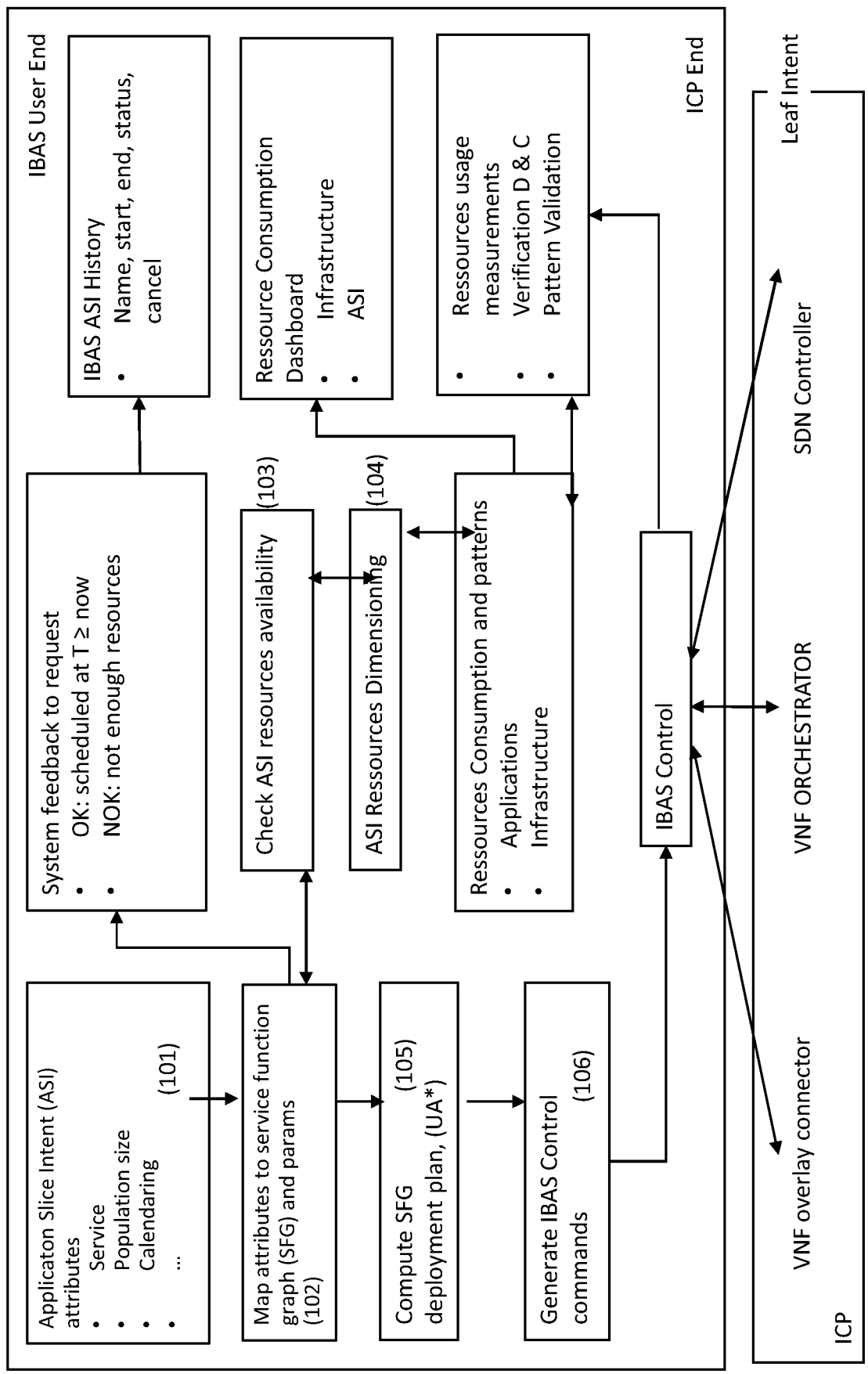
FIG. 1 shows a schematic diagram illustrating an intent processing framework IBAS and steps involved in the processing of a slice deployment intent.

FIG. 1 illustrates steps involved in the processing of one or more intents, such as a slice intent, deployment in IBAS. Key field values received in step (101) from a client are transformed separately in commands and parameters by several functions in several steps. At least some example embodiments, the processing of the one or more intents relate to, for example, IoT services, cloud services and/or telecom services, and in particular to transforming intent expressions into commands and configurations to manage the one or more services.

In step (102), the key field values are transformed in a set of VNFs to be deployed.

In step (103), ASI resources availability is checked.

In step (104), other key field values are transformed in deployment parameters such as infrastructure resources and VNF resources requirements. Alternatively or additionally, the deployment parameters can be such as one or more system resources, for example, computational, memory, server and/or network latency and/or capacity resources, in any system, apparatus or device.

In step (105), parameters produced by steps (102) and (104) are transformed in a graph of interconnected VNFs.

In step (106), the VNF graph is transformed into a set of commands for the deployment of the VNF by an orchestrator and their interconnections as specified by the graph.

Other lifecycle management actions are supported, such as cancelling, calendaring and ending an application deployment.

The IBAS architecture is compliant with the NMRG-defined fulfillment and assurance functions distributed in the user space, Intent-based system space, and network operations space. It reduces the deployment time of atomic linear slices from 1-2 hours to 1-2 minutes while providing feasibility feedback. However,
- the presented architecture focuses on deployment functionalities,
- no formal method to parse and transform intent key fields is specified,
- no functionalities are defined to speed up the identification of deployment parameters and resources, and
- no clear lifecycle management of intents and related target functions.

Further, there are transformational languages which translate expressions from a language L1 to another one L2, based on term parsing and mapping. A popular example is Turing Extender Language (TXL). TXL associates a token to a keyword of a language L1 and defines a translation in another language L2. Opensource projects already produced translations among JSON, XML, JAVA, CSHARP and Python programming languages. TXL is not language-specific: it parses keywords in L1 expressions, maps to L2 keywords and renders the expression in L2 format.

TXL is flexible as mappings can be defined by anyone. However,
- intents are not expected to be translated to some other language, because they may end up in different types of expressions in several possible languages, depending on infrastructure technology;
- a "transformation" of an intent expression is much more complex and the current transformation languages do not support:
  - the diversity in roles played by intent key fields such as: action, desired state, date; and
  - the switching to several possible languages used by infrastructure control functions, e.g. Swarm and Kubernetes, Onos and Opendaylight.

In addition, there are standard Traffic Management (TM) Forum interfaces.

The standardization body TM Forum defines interfaces to allow clients to request a number of services on applications together with a set of lifecycle actions on the deployed services. However, the TM Forum interfaces do not reach out to the level of a client intent and handle more technical formal templates such as the GST.

In the following, at least some example embodiments will be described with reference to FIGS. 2 to 10.

According to at least some example embodiments, examples of intents comprise intents for the deployment and operation of network slices (NS) for vertical applications. Several actions can be requested on a NS via an intent, including creation, deployment, update, deletion, cancellation, or calendaring. It is noted, however, that the examples of intents are not limited to intents with respect to network slices, but cover intents which are associated with any system, apparatus or infrastructure of a communication network.

According to at least some example embodiments, intent expressions for creation, deployment and operations of slices for vertical applications are considered which are referred to as Application Slice Intents (ASIs). An ASI as described above with respect to the IBAS is structured as a sequence of key fields that have key values received from a client. Such intents are composite in terms of a role played by the different key fields, that can be as diverse as an action, a parameter, a date, and a quality label.

An ultimate goal of ASI parsing is to generate a set of instructions that are sent to one or more infrastructure control functions such as SDN controllers and/or orchestrators, or to interfaces to service deployment and operations functions. The input to such instructions is a deployment plan of a slice.

According to at least some example embodiments, a method referred to as IMT (Intent Mapping and Translation) is used to parse received key field values and transmit them as input to Key field Receiving Functions (KRFs) that will take action upon the parsed received key field value and generate an output that will in turn be transmitted to receiving functions, until the generated output can be transmitted to a target function characterized by the fact that it is interfaced with infrastructure control functions or an interface to a group of control functions. This method will be described in more detail later on in example embodiment 1.

According to at least some example embodiments, a so-called "parsing shortcut" method is used to speed up the parsing and directly get slice resources dimensioning information and relevant associated information based on previous intent executions. This step additionally updates and optimizes slice dimensioning parameters based on best observed execution performances. The parsing shortcut method will be described in more detail later on in example embodiment 2.

Figure 2:
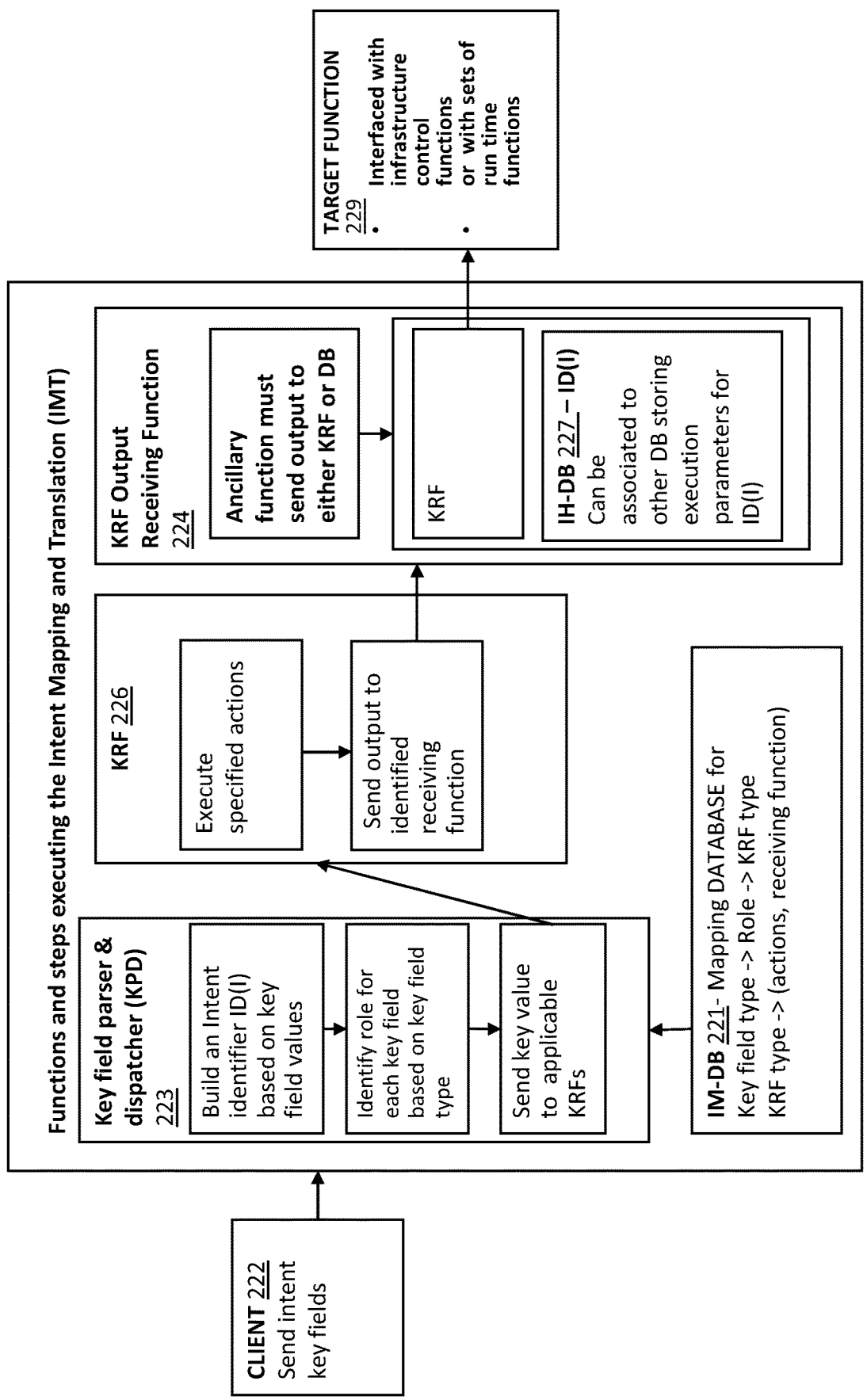
FIG. 2 shows a schematic diagram illustrating functions and steps involved in Intent Mapping and Translation (IMT) according to at least some example embodiments.

FIG. 2 shows a schematic diagram illustrating functions and steps involved in the Intent Mapping and Translation (IMT) according to at least some example embodiments. The illustrated functions include a key field parser and dispatcher (KPD) 223, a KRF 226, a KRF output receiving function (KRF-ORF) 224 and an intent mapping function and database (IM-DB) 221.

FIG. 3 shows a table illustrating an example of the IM-DB 221 for key fields which are defined in IBAS.

According to at least some example embodiments, the IM-DB 221, as illustrated in FIG. 3, defines an example set of supported one or more key field types (which is also referred to here as "set of key field types defined in advance"), at least one role of a set of roles (which is also referred to here as "set of roles defined in advance") assigned to the key fields, a type of KRF of a set of types of KRFs defined in advance assigned to the roles, and KRF-ORFs assigned to the KRFs.

The set of supported key field types comprises at least one or more of intent action, intent-name, number-of-devices, location, start-end-date, duration or QoE.

The set of roles includes at least one or more of lifecycle action intent, application type ID, intent deployment parameter, intent dimensioning parameter or intent calendaring parameter.

As shown in FIG. 3, a role is assigned to one or more key fields, where a role can itself be an intent, meaning that a key field type having the role of an intent is viewed as an intent composed of a single key field type whose key field value is considered as a key field type, with an associated role. An example of the associated role is a role of infrastructure update which will be described in more detail later on.

Further, as shown in FIG. 3, one or more KRFs are assigned to a role. FIG. 3 illustrates a specific application example and will be described in more detail later on.

The IM-DB 221 defines actions taken by the KRFs, and, if applicable, specifies ancillary functions receiving the output of the KRF, and actions taken by the ancillary functions. FIG. 2 illustrates the KRF-ORF 224 as comprising a KRF, a database IH-DB 227 and an ancillary function.

According to at least some examples, an ancillary function does not start before having received complete input.

According to at least some examples, output of an ancillary functions is sent to a KRF or another ancillary function.

According to at least some examples, an ancillary function is a database.

The IM-DB 221 further identifies a target receiving function (also referred to as target function) that will transmit one or more machine instructions resulting from the intent parsing and transformation to one or more functions outside of the framework.

According to at least some examples, a KRF type is defined by
the one or more key field roles it is able to receive,
the actions to perform based on a key field value, and
the function receiving the output of the action.

According to at least some examples, the ancillary function knows from the IM-DB 221 from which function to expect input.

Figure 4:
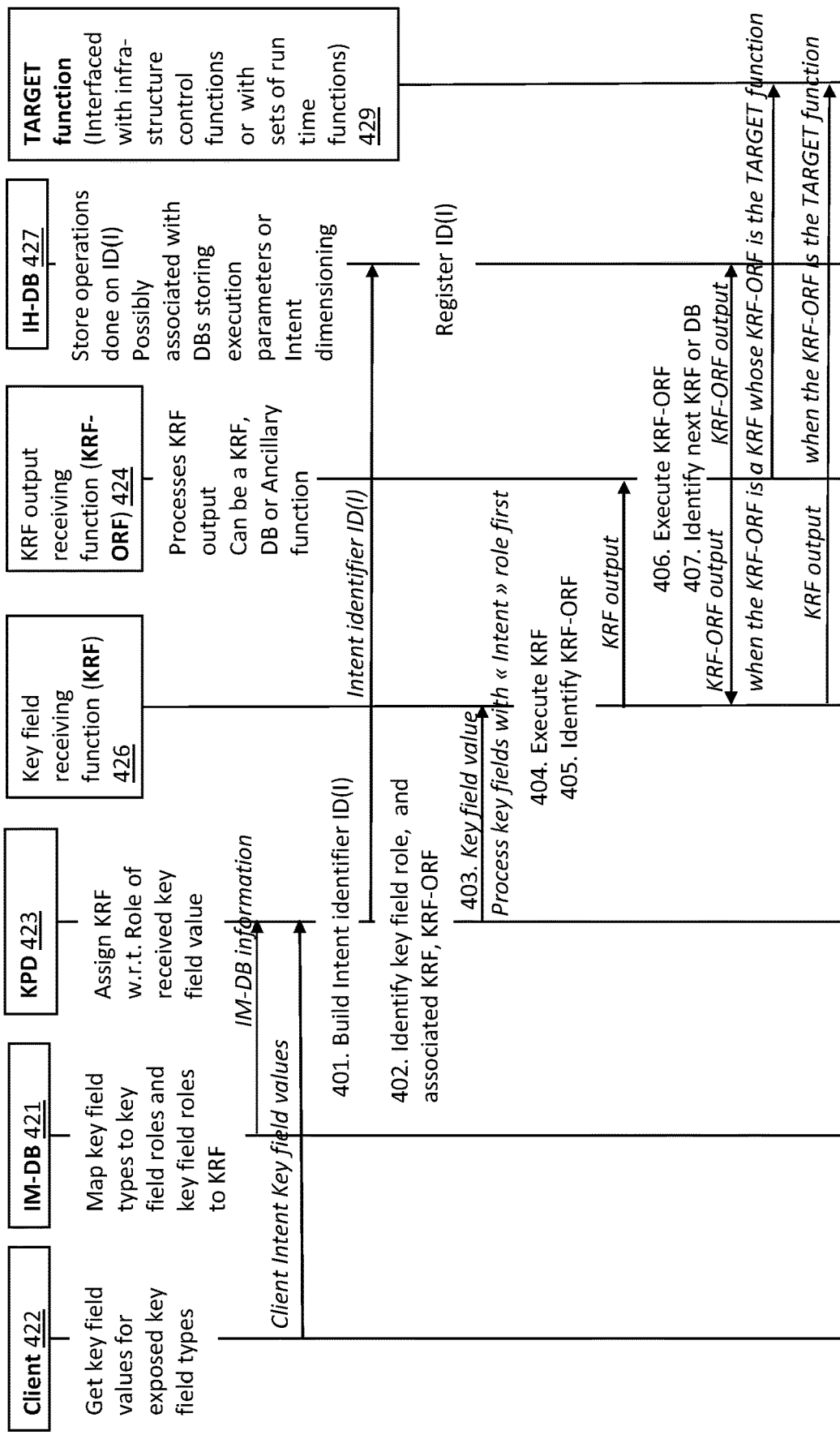
FIG. 4 shows a sequence diagram illustrating how intent key fields are parsed, processed and circulated among the different IMT functionalities according to at least some example embodiments.

Now reference is also made to FIG. 4 which shows a sequence diagram illustrating how intent key fields are parsed, processed and circulated among the different IMT functionalities according to at least some example embodiments. According to at least some examples, entities 221 to 224, 226, 227 and 229 shown in FIG. 2 correspond to entities 421 to 424, 426, 427 and 429 shown in FIG. 4.

In a step 401, when intent key field values (which are also referred to here as "key values of key fields included in a sequence of one or more key fields expressing a received intent") are received from a client 422, a KPD 423 constructs an unambiguous intent identifier ID(I) based on the key field values. Then, subsequent actions executed by the IMT functions on this intent are associated with ID(I). As shown in FIG. 4, the ID(I) is stored in IH-DB 427 which stores operations performed on the ID(I). According to at least some examples, the IH-DB 427 is associated with DBs storing execution parameters and/or intent dimensioning.

In a step 402, the KPD 423 then parses the key field and its key value. Based on IM-DB information received from the IM-DB 421 (e.g. the information in the table shown in FIG. 3), the key field value is mapped to a key field type which is mapped to a role which is mapped to a KRF type. In this process, according to at least some examples, first the key fields that have the role of an intent are considered.

As shown in FIGS. 2 and 4, in step 403 the key field value is sent to a type of KRF that is applicable to the key field role. In step 404, the KRF 426 executes its actions and sends their output to a receiving function specified in step 405. In the example shown in FIG. 4, the receiving function is the KRF-ORF 424.

In step 406, the KRF-ORF 424 executes its actions and sends their output to a receiving function specified in step 407. The receiving function can be either a KRF or a data base (the IH-DB 427) storing the history of actions performed on intent ID(I).

When the receiving function is the target function 429, no transmission is done and the intent parsing and transformation ends when all key fields have been parsed and no more data is transmitted by a receiving function.

Figure 5:
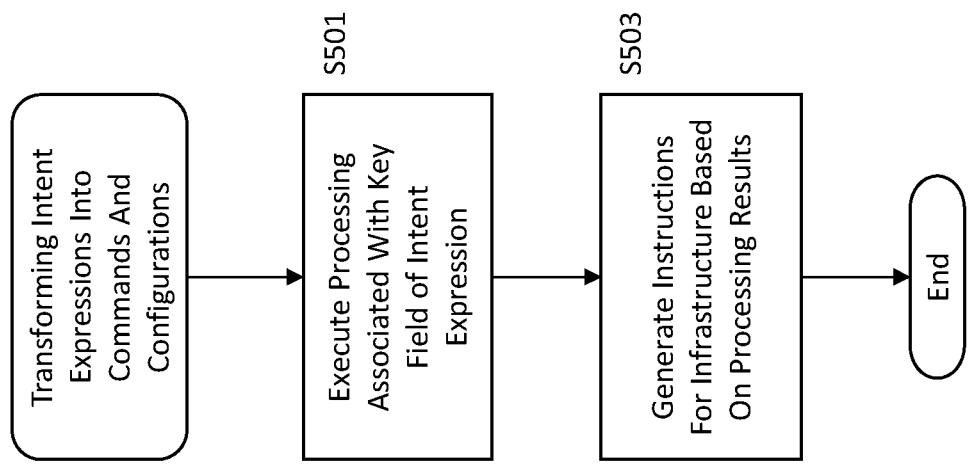
FIG. 5 shows a flowchart illustrating a process of transforming intent expressions into commands and configurations according to at least some example embodiments.

Now reference is made to FIG. 5 which illustrates a process of transforming intent expressions into commands and configurations according to at least some example embodiments.

According to at least some examples, the process illustrated in FIG. 5 is executed by the KRF 426 or the KRF-ORF 424. For example, the process starts when a key field value is received from the KPD 423 or when a KRF output is received from the KRF 426, and the process advances to step S501.

In step S501, a processing with respect to a key value of a key field included in a sequence of one or more key fields expressing a received intent is executed, wherein the received intent is associated with a specific system. Then the process advances to step S503.

In step S503, based on a result of the processing in step S501, for carrying out the received intent, one or more instructions associated with the specific system are generated for one or more control functions controlling an infrastructure. Then the process ends.

According to at least some example embodiments, the specific system comprises a network slice comprising a set of virtual network functions, VNFs, and associated network resources, wherein the set of VNFs and associated network resources is a subset of the infrastructure, wherein the infrastructure comprises a set of cloud resources and related communication network.

According to at least some examples, when the control function is an SDN Controller with which the Target Function communicates using the HTTP protocol, a generated instruction can take the form of: the HTTP "POST" request and the JSON body sent along with the "POST" request to establish or end connectivity, where the JSON body has a format and syntax compliant with the implementation of the SDNC.

Further, according to at least some examples, when the control function is an orchestrator with which the Target Function communicates using the HTTP protocol, a generated instruction can take the form of: the HTTP "POST" request and the JSON body sent along with the "POST" request to add or remove a VNF in a server, where the JSON body has a format and syntax compliant with the implementation of the Orchestrator.

In the following, example embodiments 1 and 2 will be described.

Example Embodiment 1: IMT Defined for Key Fields and Functions Defined for IBAS (Intent-Based Application Slicing) Framework The example embodiment 1 refers to an implementation of the IMT method for key fields and functions defined for the IBAS framework, in particular for IM-DB 221 and steps of IMT.

An intent identifier ID(I) is defined based on key values of key fields included in a sequence of one or more key fields expressing a received intent. The key values are arranged to form a unique intent identifier ID(I) for example in the form of a hashtag. When an intent is created, its key field values and resulting intent identifier ID(I) are registered in the Intent History data base IH-DB 227 shown in FIG. 2, together with the status of ID(I), where status values include: running, ended, cancelled, scheduled, stalled, aborted.

An instantiation of the IM-DB 221 is summarized in FIG. 3.

The IM-DB model is generic and fully flexible as it deals with types and roles rather than directly with values. This way, it is easy to add and remove features such as key field types and key field roles.

As illustrated in FIG. 3, the defined key field roles include at least one or more of a lifecycle action intent, an infrastructure update, an application type ID, an intent deployment parameter, an intent dimensioning parameter, or an intent calendaring parameter.

The lifecycle action intent defines an action to be done on a slice identified by ID(I). This role is assigned at least to key field "intent-action". Values include, for example but not limited to create, add, deploy, cancel, delete, update, release, etc.

Infrastructure update defines an action that impacts the infrastructure as opposed to impacting a database only, and applies to key fields having the role of a "lifecycle action intent". Values include, for example but not limited to deploy, release, etc. For example, the infrastructure update comprises a change on at least a part of the infrastructure.

Application type ID defines the type of the application defined by key field type "intent-name". Examples are IoT-sensor, eMBB-gaming, etc.

Intent deployment parameter defines where the application slice is deployed. This role is assigned at least to key field type "location".

Intent dimensioning parameter defines the dimension of the intent, for example, in one or more terms of served population, duration and/or user satisfaction. This role is assigned at least to one or more of "number-of-devices", "duration", or "QoE".

Intent calendaring parameter defines when and how long an action is to be taken. This role is assigned at least to one or more key fields "start-end-date" or "duration".

Here, key field types are defined, rather than key fields, for the sake of flexibility. Key field type "start-end-date" for example is able to take different names and encodings, such as "start" or "end" as long as the associated type is unambiguously encoded.

According to at least some examples, some key fields like duration may have several roles and thus be received by several Key field Receiving Functions (KRFs).

When a key field type has the role of an intent, its key field value is considered as a key field type and has a role. For example, key field type "intent-action" has the role of an intent. Its value is for instance "deploy" or "cancel". In this example, "deploy" applies to a deployed slice and has a role set to "infrastructure-update" while "cancel", as it does not, has a role set to "DB-update".

The defined types of KRFs (Key field Receiving Functions) include at least the following one or more intent processing functions:
  Lifecycle actions (LCA) that processes the intent lifecycle actions encoded in the received key values and prepares for possible technology specific translation;
  Blueprint data base (BP-DB) that specifies a generic VNF graph G(A) needed to run the application;
  Dimensioning function that computes computing resources needed by the VNFs of G(A) and network resources needed to interconnect the VNFs;
  Deployment function that defines where the infrastructure the VNFs are to be placed; and
  Calendaring function that defines when the action on the slice is performed and, if applicable, for how long it is performed.

The actions taken by a KRF (such as KRF 226 of FIG. 2) are specified by its type and the role associated with the received key field.

Actions Defined for LCA (Lifecycle Actions) Function

A KRF of type LCA (also referred to as "KRF-LCA") is a key receiving function of the IMT (Intent Mapping and Translation), which receives key values of key fields of role "lifecycle action intent" in a sequence of one or more key fields expressing a received intent.

The KRF-LCA receives a key field value "Vaction" of role "lifecycle action intent", from a client interface and gets ID(I) of the received intent I.

The KRF-LCA checks a history DB IH-DB (Intent History Data Base) (such as IH-DB 227 of FIG. 2).

If ID(I) exists in the IH-DB and lifecycle actions have been already previously performed on I, i.e., an intent history H(I) is not empty:
  If the role of the key field type "Vaction" is "infrastructure-update": the KRF is an LCA2I translation function that receives key field value "Vaction". Examples of the Vaction are such as "deploy" or "release".
  If the role of the key field type "Vaction" is "DB-update": the KRF is the IH-DB, that receives the key field value "Vaction". Examples of the Vaction are such as "cancel", "add", "create", "schedule", "edit", or "replace".

If ID(I) does not exist in the IH-DB or the lifecycle actions have not been already previously performed on I, i.e., the intent history H(I) is empty:
  Other key fields of the sequence expressing the received intent ID(I) are parsed.
  A deployment plan computed by ancillary VNF deployment computation is received from a deployment DB (e.g. DP-DB 616 shown in FIG. 6 to be described later on), or a failure notification is received e.g. due to a resources scheduling problem.
  Other related information is stored in relevant DBs (dimensioning DB, IH-DB).
  KRF is LCA2I translator 617 shown in FIG. 6 to be described later on.

Actions Defined for the Lifecycle Actions to Infrastructure Translation Function (LCA2I)

The KRF LCA2I translation is the last functional hop to the target function.

The KRF LCA2I (e.g. implemented by KRF-ORF 224 of FIG. 2) receives the key value of key field of type lifecycle action intent that has a role set to "infrastructure-update". The KRF LCA2I knows an ID(I) and is able to retrieve the deployment plan in the deployment DB (DP-DB). As for actions, the KRF LCA2I translates technology-agnostic instructions to commands that will be sent to the target function, that will transmit instructions to the controllers in the infrastructure or to an interface to such functions, upon careful scheduling. These commands use the language of the implementation of the controllers and to this end the LCA2I function uses a dictionary DB borrowing from the transformation language TXL concepts.

Actions Defined for KRF of Type Blueprint DB

This KRF receives a key value (e.g. "A") of key field of role "Intent application type" with key value A identifying an application type, and uses A as a look up key to get the slice VNF graph G(A).

For example, graph G(A) comprises one or more sets of so-called virtual network function, VNF, chains, where a VNF chain comprises VNFs connected by directed edges.

Actions Taken by KRF of Type Dimensioning Function

This KRF receives a key value of a key field of role "Intent dimensioning parameter". Based on values of key fields of type "number-of-devices", "duration", "QoE", the KRF gets the slice dimensioning information for ID(I) in terms of: amount of computing resources required by the VNFs of G(A) and the network resources needed to interconnect the VNFs. This information is assumed to be available, at this infrastructure provider level.

Actions Taken by KRF of Type Deployment Function

This KRF receives a key value for a key field of role "Intent deployment parameter". When key field is of type "location", the KRF defines candidate data centers where the VNFs can be placed.

Actions Taken by KRF of Type Calendaring Function

This KRF receives a key value for key fields of role "Intent calendaring parameter", in particular key field types "start-end-date" and/or "duration". Accordingly, the KRF sets a desired schedule for execution of the "lifecycle action intent" if resources issues are cleared and transmits the two key field values to KRF LCA2I.

Figure 6:
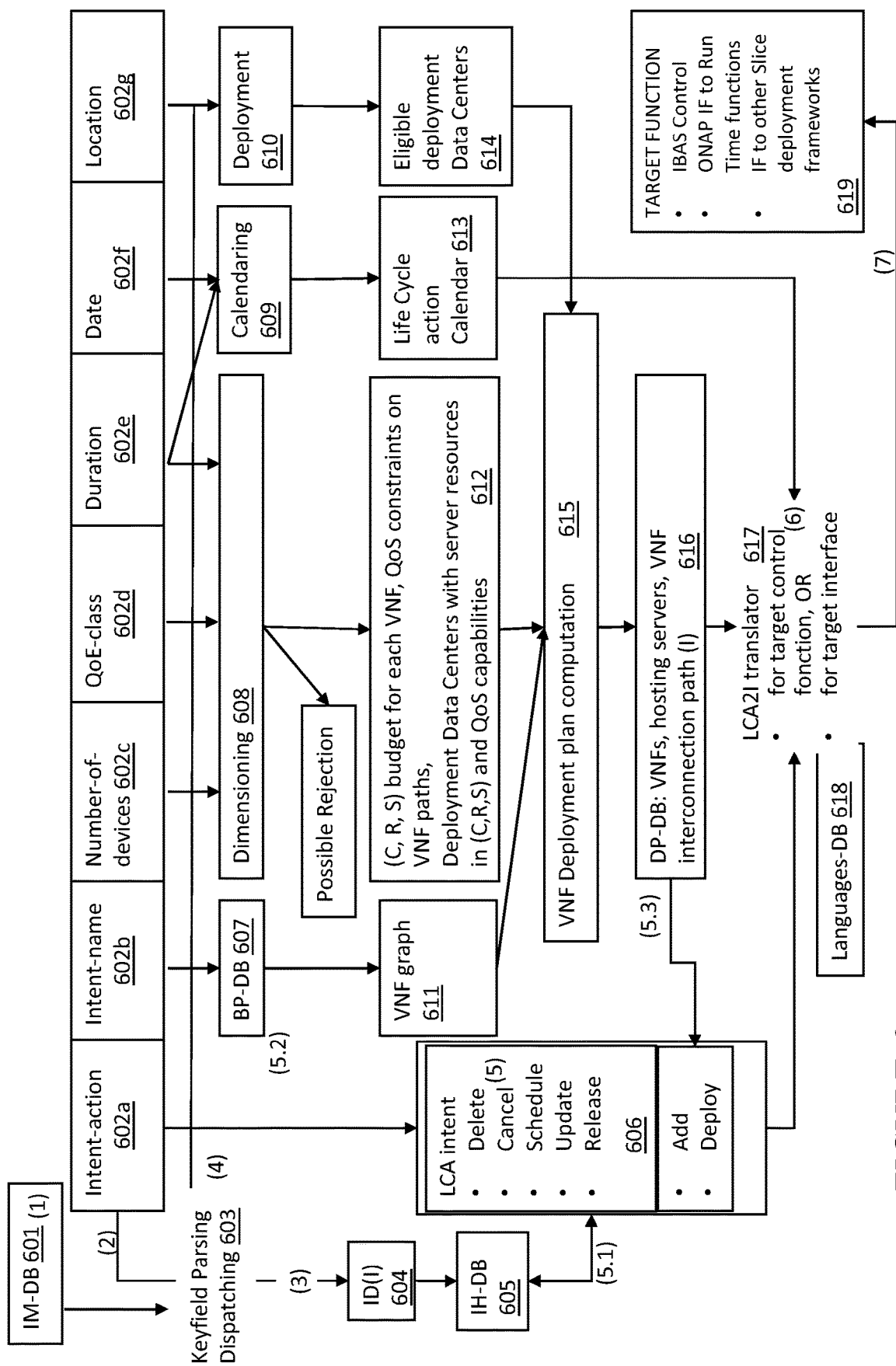
FIG. 6 shows a schematic diagram illustrating IMT features and steps according to example embodiment 1.

FIG. 6 illustrates example embodiment 1 for IBAS based on mapping defined in FIG. 2. Key receiving functions (KRFs) are indicated by reference signs 606, 607, 608, 609, 610 and 617. Their output is indicated by reference signs 611, 612, 613 and 614. An ancillary function is indicated by reference sign 615, and main steps are indicated by reference signs (1) to (7).

According to at least some examples, the KRFs 606, 607, 608, 609, 610 and 617 correspond to KRF 226 of FIG. 2.

According to at least some examples, entities 601, 603, 617 and 619 correspond to entities 221, 223, 224 and 229 of FIG. 2.

Key fields 602a-g shown in FIG. 6 form a sequence expressing a received intent I.

Figure 7:
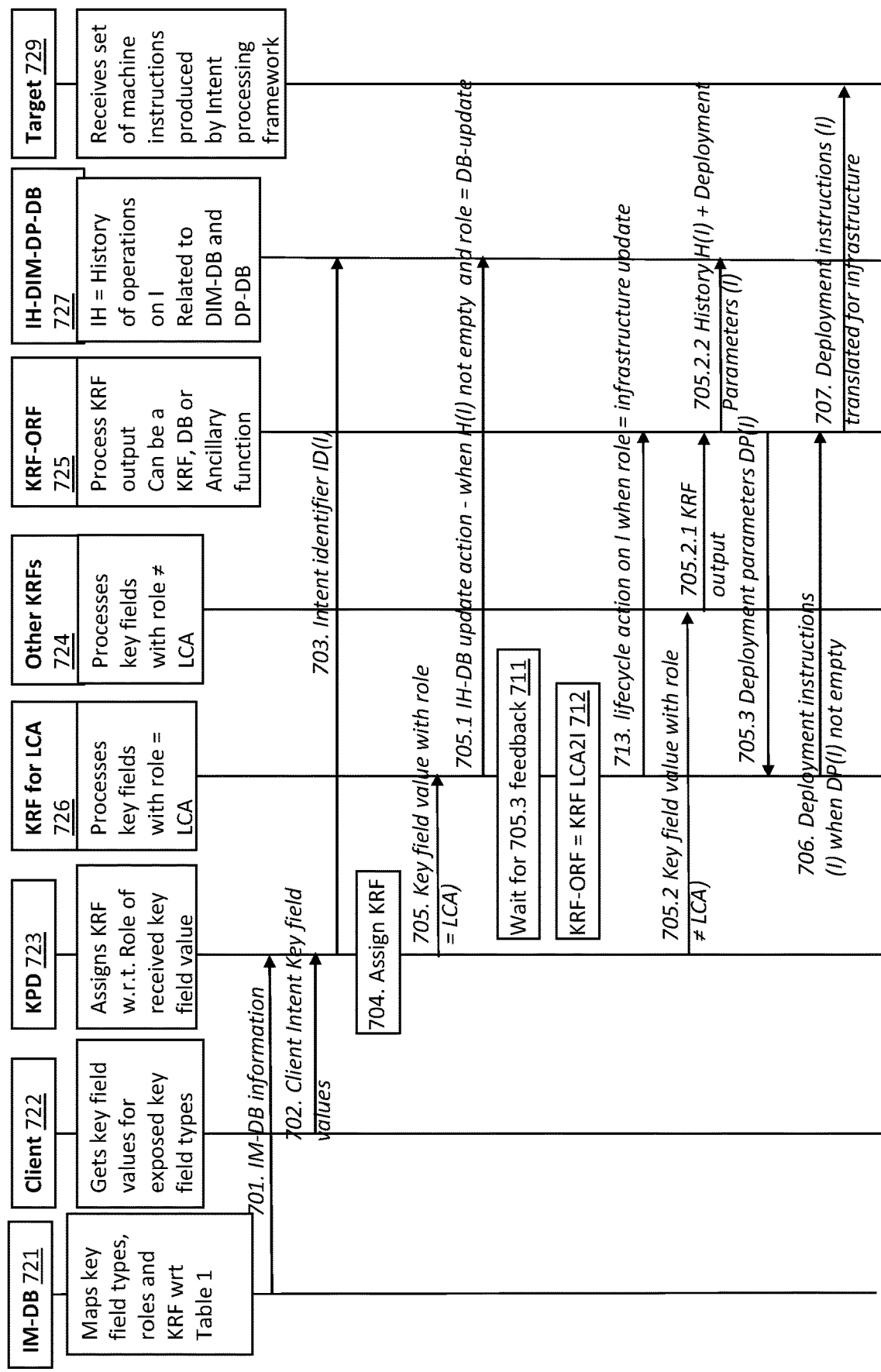
FIG. 7 shows a sequence diagram illustrating communication steps according to example embodiment 1.

Further, FIG. 7 shows a process in a sequence diagram of steps 701 to 713 according to example embodiment 1.

In step (1) of FIG. 6 or step 701 of FIG. 7, IM-DB 601, 721 is defined according to a framework, in the present example the IBAS framework illustrated in FIG. 3, and information on the IM-DB 601, 721 are sent to a KPD 603, 723.

In step (2) or step 702, the KPD 603, 723 receives key field values of key fields included in the sequence of key fields 602a-g expressing the received intent I from a client 722.

In step (3) or step 703, the KPD 603, 723 generates a specific intent identifier ID(I) 604 and sends it to IH-DB 605 (illustrated in FIG. 7 as being part of IH-DIM-DP-DB 727).

In step (4) or step 704, the KPD 603, 723 parses the value of intent-action key field type 602a and assigns a corresponding KRF based on the IM-DB information received in step 701.

In case the key field value is associated with a role of LCA, KRF LCA 606, 726 is assigned in step (4) or step 704 and receives the key field value in step (5) or step 705.

If the ID(I) 604 is recorded in the IH-DB 605, 727, and the intent history H(I) is not empty, in step (5.1) or step 705.1, the KRF LCA 606, 726 performs actions indicated in above section "Actions defined for LCA function". According to FIG. 7, in step 705.1 the KRF LCA 606, 726 performs an IH-DB update action when the H(I) is not empty and the role is DB update.

Further, for example, after having received 705.3 feedback in step 711, the KRF LCA 606, 726 assigns KRF-ORF (KRF LCA2I) 617, 725 in step 712 and the KRF-ORF (KRF LCA2I) 617, 725 receives the key field value in step 713 for performing lifecycle action on I when the role is infrastructure update, as described above in "Actions defined for LCA function".

Otherwise, if the ID(I) is not recorded in the IH-DB 605, 727 or the intent history H(I) is empty, the KPD 603, 723 parses the other key fields 602b-g with respect to their roles in the following order:
1. Application type ID
2. Intent calendaring parameter
3. Intent Deployment parameter
4. Intent Dimensioning parameter According to a result of the parsing, in step (5.2) or step 705.2, a KRF 607, 608, 609, 610, 724 receives the key field value.

In step 705.2.1, output of the KRF 607, 608, 609, 610, 724 is transmitted to a KRF-ORF 725 associated with the KRF 607, 608, 609, 610, 724.

In step 705.2.2, history H(I) and deployment parameters DP(I) are stored in the IH-DB 605 and/or DP-DB 616, 727.

In step 705.3 or step (5.3), the KRF LCA 606, 726 receives the deployment parameters DP(I) from the DP-DB 616, 727 including a deployment plan from an ancillary VNF deployment computation 615. According to at least some examples, the deployment plan is stored in the DP-DB 616, 727. For example, the deployment plan is empty and comprises a failure notification.

In step (6) when the DP(I) is not empty, the KRF LCA2I 617, 725 receives, in step 713, a key value of a key field of type "lifecycle action intent" that has a role set to "infrastructure-update". The key value is for instance "deploy" or "release". The KRF LCA2I 617, 725 receives, in step 706, the deployment instructions related to the deployment parameters DP(I).

Based on the ID(I) and languages DB 618, the KRF LCA2I 617, 725 translates instructions to implementation specifics.

In other words, in step 706 the deployment parameters DP(I) have been successfully computed, where successfully means they are compliant with the infrastructure resources availability. As a consequence, DP(I) is not empty. IH-DB 605, 727 is not empty at this stage.

Further, the deployment parameters DP(I) are sent to KRF LCA2I 617, 725 as parameters to the lifecycle action performed on I, as it is the case for instance, when a slice is to be deployed or resized.

In step 713, the deployment parameters have been successfully computed. (for instance, upon a request to release, or deploy or resize a slice). As a consequence, DP(I) is not empty. KRF for LCA 726 sends to LCA2I 617, 725 a key value of a key field of type "lifecycle action intent" that has a role set to "infrastructure-update".

Besides, in step 706, when DP(I) is empty, this means that the deployment plan computed for the VNF chain was not successful, due to e.g. lack of available resources or insufficient network capabilities. According to at least some example, when DP(I) is empty, no slice deployment occurs and no instructions are generated. For example, the failure is reported in the History DB and to a requester and the process stops there.

In step (7) or step 707, the KRF LCA2I 617, 725 transmits one or more sets of commands (e.g. deployment instructions (I) translated for infrastructure) to Target function 619, 729.

The following example illustrates an outcome of IMT (Intent Mapping and Translation) for the key fields supported by IBAS implementation:

intent action 602a: maps to a command of value [action-type] sent to the Target function 619, 729 "IBAS Control" of FIG. 6. This command can itself be viewed as an Intent as its expression, such as "add", "delete", "update", "list", or etc. is technology-agnostic. A specific KRF named LCA2I translator 617, 725 further translates it in expressions that are specific to the implementation of SDN Controller or Orchestrator it interfaces with.

intent-name 602*b* [application-type]: maps to a lookup instruction in the Blueprint KRF 607 with the search key equal to [application-type].

number-of-devices 602*c* [number], QoE 602*d* [string], duration 602*e* [time]: are sent to the Dimensioning KRF 608 that computes the VNF resources budget and QoS constraints 612.

duration 602*e* [time], start-end-date 602*f* [date]: are sent to the Calendaring KRF 609.

location 602*g* [name-of-place]: is sent to the IBAS Deployment plan computation KRF 610, 724, that maps [name-of-place] to an area in the infrastructure where the slice will be deployed.

Example Embodiment 2: Example Embodiment 1 with Smart Encoding and Fast Retrieval of Dimensioning Parameters According to at least some examples, some intent key field values are arranged. For example, referring to FIG. 6, some key values of key fields 602*a-g* are arranged.

According to example embodiment 2, some intent key fields are arranged and stored so as to build intent identifiers with associated information, that are stored in a cache, in order to speed-up the search for a service graph (e.g. VNF graph 611), resources budget (e.g. budget 612) and other information needed to compute the deployment plan e.g. in block 615.

According to at least some examples, the key value of key field 602*g* "location", after parsing, is mapped to an identifier IDA(L) of an area in the infrastructure where the slice will be deployed. The IDA(L) defines a unique semantic meaning and avoids codes possibly mapping to several entities such as city, region, country and/or area.

According to at least some examples, values in intervals for key field 602*c* "number-of-devices" exposed to the client are rounded up so as to correspond to an integer number of cores in delay-sensitive VNFs of a generic graph G(I) (e.g. VNF graph 611) plus a "cosmetic" round-up margin.

Further, according to example embodiment 2, intent values are stored and cached as described below.

Figure 8:
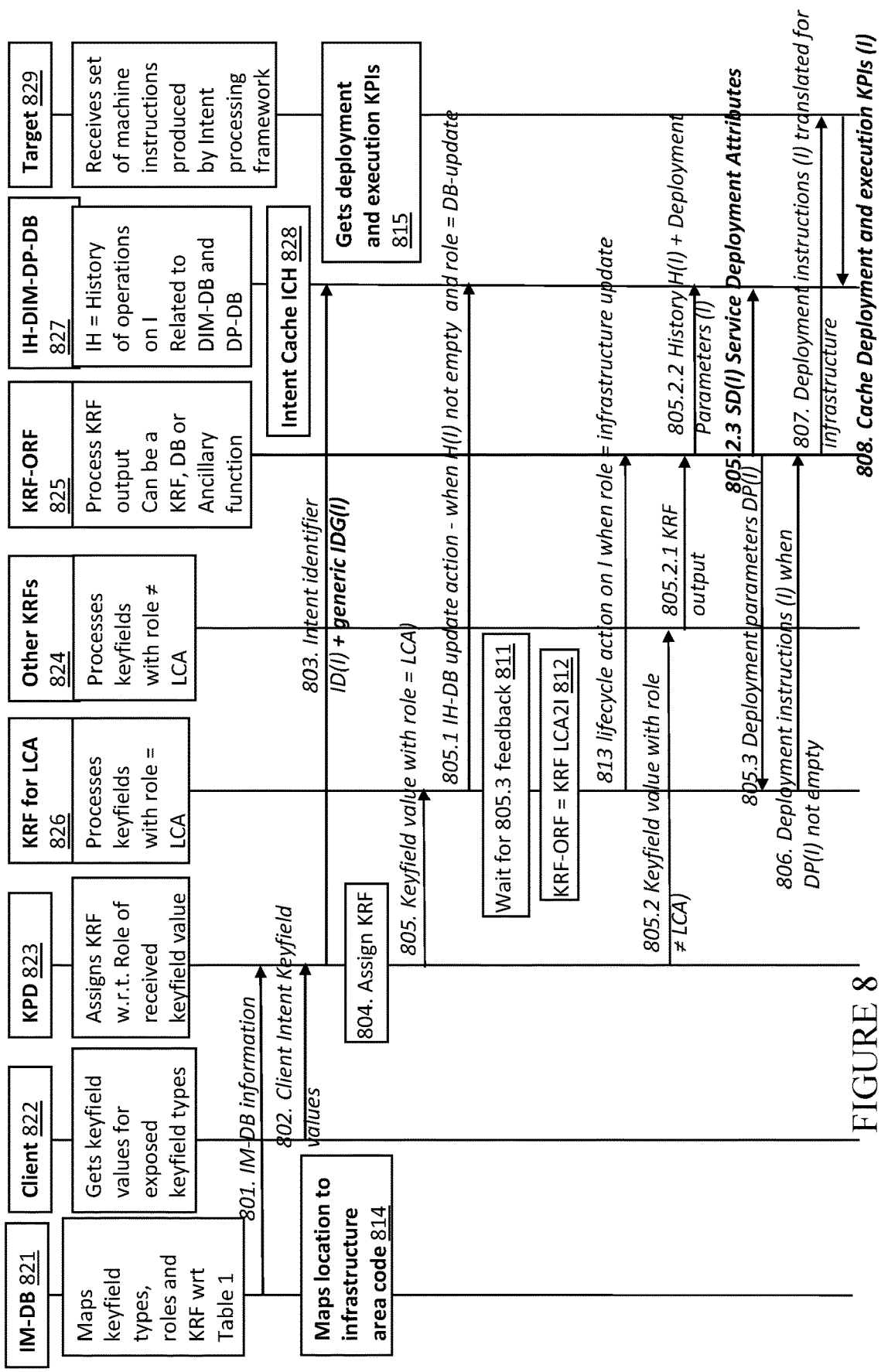
FIG. 8 shows a sequence diagram illustrating communication steps according to example embodiment 2.

According to at least some examples, when an intent is deployed, its key field values and resulting identifier ID(I) are additionally stored in an intent cache ICH 828 shown in FIG. 8. A generic intent template is extracted from the key values of the key fields intent-name 602*b*, number-of-devices 602*c* interval, QoE-class 602*d*, duration 602*e* and/or IDA(L) where the key value of the key field 602*g* "location" has been mapped to the IDA(L).

From the above key field values a generic intent identifier IDG(I) is generated and serves as a search key in the cache ICH 828.

According to at least some examples, for each generic identifier IDG(I), ICH 828, 928 stores the following set SD(I) of service deployment attributes:

An updated "Intent Family Set" of associated intent identifiers FID(I)={IDG(I)+date}.

The associated Service Graph G(I), e.g. VNF graph 611.

For each VNF chain of G(I), the requirements in BW (bandwidth) and Latency capabilities.

For each individual VNF, the associated required budget in Cloud resources C, R and S (CPU, RAM, Storage).

According to at least some examples, for the identifier IDG(I), execution information is additionally stored, which comprises deployment KPIs (e.g. at least one of deployment time, number of deployment trials, pointer to incidents), execution KPIs in terms of associated QoS and other quality parameters, either averaged over the date or specific to each date.

With the above-described arrangement of intent key field values and storage and cache of intent values, the IMT is speeded up as described below.

According to at least some examples, transformation of an intent is speeded up by providing slice resources dimensioning parameters and system commands, and the slice dimensioning parameters are updated and optimized based on observed execution performances.

Figure 9:
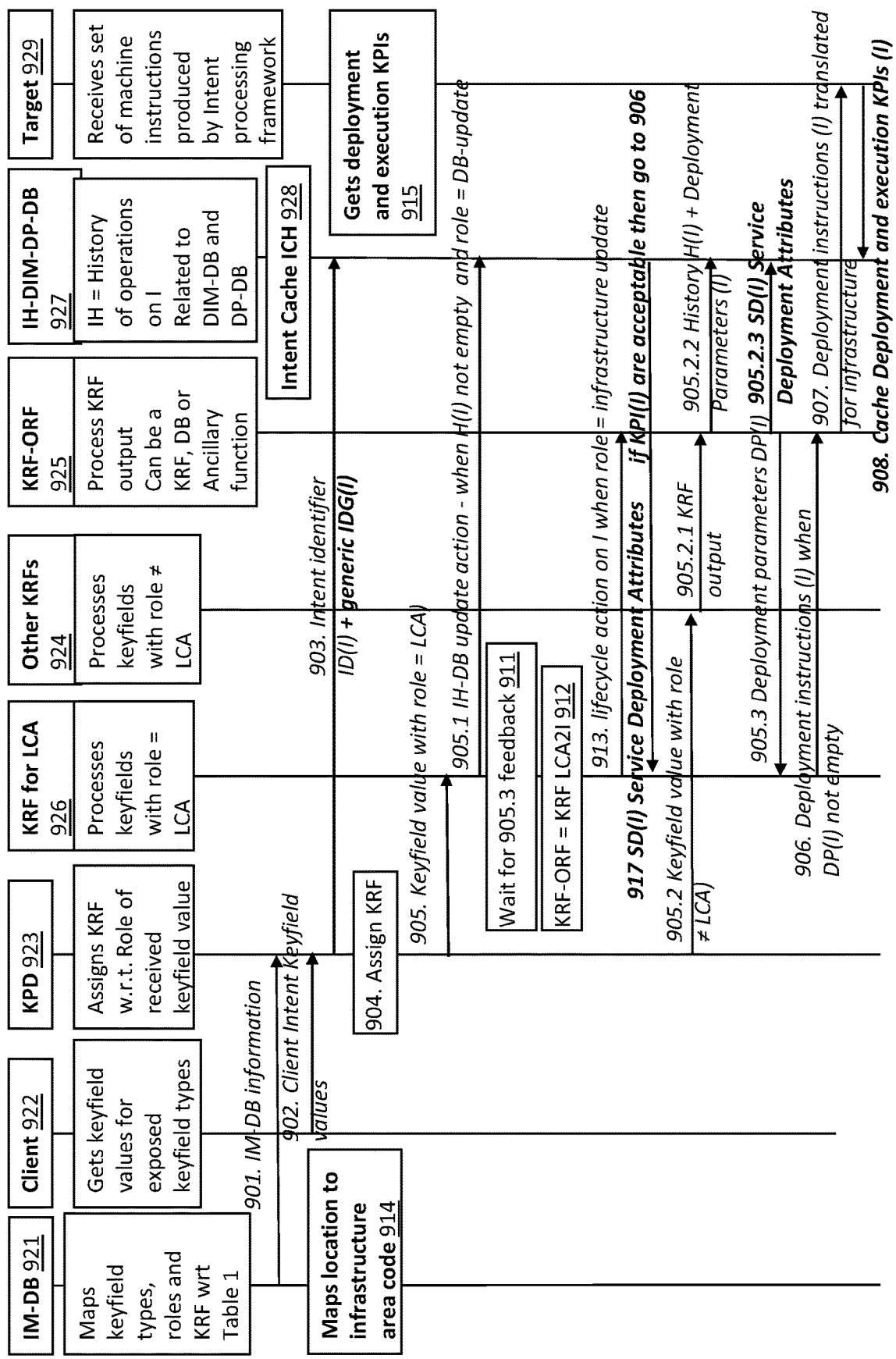
FIG. 9 shows another sequence diagram illustrating communication steps according to example embodiment 2.

FIGS. 8 and 9 show respective processes in sequence diagrams illustrating communication steps according to example embodiment 2.

In particular, FIG. 8 illustrates smart encoding and fast retrieval of dimensioning parameters when no lifecycle operations were yet done on the intent I. FIG. 9 illustrates smart encoding and fast retrieval of dimensioning parameters when lifecycle operations were previously done on the intent I.

Entities 821 to 827 and 829 shown in FIG. 8 are similar to entities 721 to 727 and 729 of FIG. 7, and only differences to example embodiment 1 will be described below. Further, entities 921 to 929 shown in FIG. 9 correspond to entities 821 to 829 of FIG. 8.

In addition, steps 801 to 807 and 811 to 813 are similar to steps 701 to 707 and 711 to 713 of FIG. 7, and merely differences to example embodiment 1 will be described below. Further, steps 901 to 908 and 911 to 915 shown in FIG. 9 correspond to steps 801 to 808 and 811 to 815 of FIG. 8.

Step 814, 914 indicates mapping of key value of key field 602*g* "location" to an infrastructure area code in IM-DB 821, 921, as described above.

When an intent is entered by a client 822, 922 for deployment, the following steps are performed.

In steps 803, 903, specific and generic identifiers, respectively ID(I) and IDG(I), are generated as described above.

Intent Cache ICH 828, 928 is looked up with search key IDG(I).

According to at least some examples, if IDG(I) exists in ICH 828, 928:

a. information needed for deployment (e.g. deployment plan, system commands, etc.) is acquired from the ICH 928 in step 917;

b. execution performances and incidents, associated with the key field 602*f* "start-end-date" are acquired from the ICH 828, 928 in step 917; if KPIs which were obtained by target 829, 929 in step 815, 915 and cached in step 808, 908 are tagged as bad or classified as instable, a new deployment plan is computed;

c. possible updates regarding resources requirements in CPU C, RAM R, and Storage capacity S and constraints on BW and Latency are entered in Blueprint DB 607 and in a slice dimensioning DB (SD-DB).

If IDG(I) does not exist in ICH 828, 928, a. a new entry is created in the ICH 828, 928 and in the applicable DBs (BP-DB, IH-DB) 827, 927;

b. dimensioning information is stored in the ICH 828, 928 and in the BP-DB 827, 927 in step 805.2.3, 905.2.3;

c. execution information is stored in an analytics DB associated with the IH-DB 827, 927.

As shown in FIG. 9, computation intensive steps 905.2, 905.2.1, 905.2.2, 905.2.3 and 905.3 can be skipped when previous deployment was successful, e.g. if KPIs(I) acquired in step 917 are acceptable then the process goes to step 906.

According to at least some examples, the above-described IMT core functionalities are implemented in the form of a PoC, with an IBAS Control interface to Swarm, K8S and ONOS as an SDN controller.

Now reference is made to FIG. 10 illustrating a simplified block diagram of a control unit 1010 that is suitable for use in executing one or more instructions, functions, processes and/or program products in the example embodiments. According to an implementation example, the processes of FIGS. 5, 7, 8, and 9 are implemented by the control unit 1010.

The control unit 1010 comprises one or more processing resources (e.g. processing circuitry) 1011, one or more memory resources (e.g. memory circuitry) 1012 and one or more interfaces (e.g. interface circuitry) 1013, which are coupled via one or more wired or wireless connection 1014.

According to an example implementation, the one or more memory resources 1012 are of any type suitable to the local technical environment and are implemented using any suitable data storage technology, such as one or more semiconductor based memory devices, magnetic memory devices and systems, optical memory devices and systems, fixed memory and/or removable memory. The one or more processing resources 1011 are of any type suitable to the local technical environment, and include one or more general purpose computers, special purpose computers, microprocessors, digital signal processors (DSPs) and/or processors based on a multi core processor architecture, as non-limiting examples.

According to an implementation example, the one or more memory resources 1012 comprise one or more non-transitory computer-readable storage media which store one or more programs that when executed by the one or more processing resources 1011 are configured to cause the control unit 1010 to function e.g. as one or more KRF 226, KRF-ORF 224, LCA KRF 606, BP-DB 607, Dimensioning function 608, Calendaring function 609, Deployment function 610, and/or LCA2I KRF 617 as described above.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Advantages

According to at least some example embodiments, the IMT fully automates the path from high-level intent parameters to commands sent to infrastructure control functions. This is done thanks to a robust mapping of key field, roles and functions acting upon reception of well-defined key field types.

According to at least some example embodiments, an advantageous usage of the key field role is done when defining "intent-actions" key values, where some of them end up in deployment or resources release thus impacting the infrastructure, while others end up in slice description for future use and are stored in a DB.

According to at least some example embodiments, unlike other solutions, the IMT is not restricted to deployment actions but performs other lifecycle actions which require an efficient identification, description and storage of an intent slice.

According to at least some example embodiments, the mapping functionality is flexible, as it deals with types and roles rather than directly with values. This way, it is easy to add and remove features such as key field types and key field roles.

At least some example embodiments can be interfaced with different possible deployment and run-time architectures. The IBAS architecture can be mapped with the design time module of ONAP, and interfaced, via the IMT Target function, with ONAP run-time functions.

According to at least some example embodiments, intent transformation optimization is achieved with caching of slice dimensioning parameters allowing to: (i) skip parsing of dimensioning key fields when their values are comparable; (ii) when execution KPIs are tagged as reliable, good and constant the deployment plan computation may even be skipped.

According to at least some example embodiments, integrated caching and optimization of slice dimensioning parameters based on analysis of execution performances is provided.

According to at least some example embodiments, the IMT solution described above is fast reducing deployment time of simple slices from 1-2 hours to 1-2 minutes. Thanks to both the efficiency of IMT and the rapidity of the used deployment plan computation function, that only takes a couple of seconds.

According to at least some example embodiments, an apparatus is provided, which comprises: means for executing a processing with respect to a key value of a key field included in a sequence of one or more key fields expressing a received intent, wherein the received intent is associated with a specific system; and means for generating, based on a result of the processing, one or more instructions associated with the specific system for one or more control functions controlling an infrastructure for carrying out the received intent.

According to at least some example embodiments, the apparatus further comprises means for executing the processing by a dedicated type of key field receiving function, KRF, which is selected based on a role associated with the key field.

According to at least some example embodiments,
the key field is of a key field type of a set of key field types defined in advance,
the key field type has assigned at least one role of a set of roles defined in advance, the at least one role has assigned a type of key field receiving function, KRF, of a set of types of KRFs defined in advance, and the processing is executed by the type of KRF associated with the at least one role assigned to the key field.

According to at least some example embodiments, the processing is executed, with priority, with respect to one or more key fields of the sequence, which are associated with a specific role of the set of roles, wherein the specific role itself is an intent.

According to at least some example embodiments, the apparatus further comprises:

means for, in case the key field is associated with a role which is a lifecycle action intent which is an intent comprising a single key field type whose key field value is considered as key field type, with an associated role of at least infrastructure update or database update, wherein the infrastructure update comprises a change on at least a part of the infrastructure, executing the processing by a lifecycle action KRF, the processing including sending an output of the processing executed by the lifecycle action KRF to another function which is determined based on the associated role of the key field value of the lifecycle action intent.

According to at least some example embodiments, the apparatus further comprises:

means for determining whether or not one or more lifecycle actions have already been performed on the received intent; and means for, if it is determined that the one or more lifecycle actions have not already been performed on the received intent, executing the processing with respect to a key value of at least one other key field of the sequence expressing the received intent, based on the role associated with the other key field, wherein the processing is executed by another KRF different from a lifecycle action KRF.

According to at least some example embodiments, the other KRF comprises at least one of the following:

a blueprint database KRF in case the other key field is associated with a role which is an application type identifier, a dimensioning function KRF or a calendaring function KRF in case the other key field is associated with a role which is an intent calendaring parameter, a deployment function KRF in case the other key field is associated with a role which is an intent deployment parameter, and a dimensioning function KRF in case the other key field is associated with a role which is an intent dimensioning parameter.

According to at least some example embodiments, the apparatus further comprises:

means for calculating a deployment plan of virtual network functions based on the processing executed by the other KRF.

According to at least some example embodiments, the apparatus further comprises:

means for receiving a deployment plan of virtual network functions to be used for executing the processing by a lifecycle action KRF.

According to at least some example embodiments, the apparatus further comprises:

means for, in case the key field is associated with a role which is an update of at least a part of the infrastructure, or means for, in case an associated role is an update of at least a part of the infrastructure, wherein the associated role is associated with a key field value of a lifecycle action intent which is composed of a single key field type whose key field value is considered as key field type, with the associated role of infrastructure update, executing the processing by a translation KRF, the processing including translating the key value or the key field value into the one or more instructions for the one or more control functions, and transmitting the one or more instructions to a target function which interfaces with the one or more control function.

According to at least some example embodiments, the apparatus further comprises:

means for, in case the key field is associated with a role which is an update of a database, or means for, in case an associated role is an update of the database, wherein the associated role is associated with a key field value of a lifecycle action intent which is composed of a single key field type whose key field value is considered as key field type, with the associated role of database update, executing the processing by the database, the processing including updating the database.

According to at least some example embodiments, the received intent is identified by a unique intent identifier formed by arranging key values of the key fields of the sequence expressing the received intent.

According to at least some example embodiments, a status is associated with the unique intent identifier, the status including status values of running, ended, cancelled, scheduled, stalled, aborted.

According to at least some example embodiments, the received intent is identified by an area intent identifier which includes information on an area of the infrastructure, wherein the information is derived from a key value of a key field in the sequence, wherein the key field is of a location type.

According to at least some example embodiments, for the received intent a generic intent identifier is generated from key values of specific key fields of the key fields of the sequence and stored in an intent cache.

According to at least some example embodiments, for the generic intent identifier the intent cache stores a set of service deployment attributes comprising at least one of the following:

an updated intent family set of associated intent identifiers comprising the generic intent identifier and a date, an associated service graph which comprises one or more sets of so-called virtual network function, VNF, chains, where a VNF chain comprises VNFs connected by directed edges, for a VNF chain of the associated service graph, requirements in bandwidth and latency capabilities, and for an individual VNF, an associated required budget in cloud resources.

According to at least some example embodiments, for the generic intent identifier at least one of following execution information is additionally stored in the intent cache:

deployment key performance indicators, KPIs, and execution KPIs in terms of associated quality of service.

According to at least some example embodiments, the apparatus further comprises:

means for skipping calculating and receiving the deployment plan; and means for receiving the service deployment attributes associated with the generic intent identifier from the intent cache.

According to at least some example embodiments, the apparatus further comprises:

means for skipping calculating and receiving the deployment plan in case the deployment KPIs or the execution KPIs stored in the intent cache indicate that a previous deployment of the service deployment attributes was successful.

According to at least some example embodiments, the specific system comprises a network slice comprising a set of virtual network functions, VNFs, and associated network resources, wherein the set of VNFs and associated network resources is a subset of the infrastructure, wherein the infrastructure comprises a set of cloud resources and related communication network.

It is to be understood that the above description is illustrative and is not to be construed as limiting the scope of the application. Various modifications and applications may occur to those skilled in the art without departing from the true spirit and scope as defined by the appended claims.

The invention claimed is:

1. An apparatus comprising at least one processor; and at least one memory including computer program code; the at least one memory and the computer program code configured to, with the at least one processor, cause the apparatus at least to:

execute a processing with respect to a key value of a key field included in a sequence of one or more key fields expressing a received intent, wherein the received intent is associated with a specific system; and generate, based on a result of the processing, one or more instructions associated with the specific system for one or more control functions controlling an infrastructure for carrying out the received intent, wherein the key field is of a key field type of a set of key field types defined in advance, wherein the key field type has been assigned at least one role of a set of roles defined in advance, wherein the at least one role has been assigned a type of key field receiving function, KRF, of a set of types of KRFs defined in advance, and wherein the processing is executed by the type of KRF associated with the at least one role assigned to the key field.

2. The apparatus of claim 1, wherein the processing is executed, with priority, with respect to one or more key fields of the sequence, which are associated with a specific role of the set of roles, wherein the specific role itself is an intent.

3. The apparatus of claim 1, wherein the apparatus is further configured to:

in case the key field is associated with a role which is a lifecycle action intent which is an intent comprising a single key field type whose key field value is considered as key field type, with an associated role of at least infrastructure update or database update, wherein the infrastructure update comprises a change on at least a part of the infrastructure, execute the processing by a lifecycle action KRF, the processing including sending an output of the processing executed by the lifecycle action KRF to another function which is determined based on the associated role of the key field value of the lifecycle action intent.

4. The apparatus of claim 1, wherein the apparatus is further configured to:

determine whether or not one or more lifecycle actions have already been performed on the received intent; and if it is determined that the one or more lifecycle actions have not already been performed on the received intent, execute the processing with respect to a key value of at least one other key field of the sequence expressing the received intent, based on the role associated with the other key field, wherein the processing is executed by another KRF different from a lifecycle action KRF.

5. The apparatus of claim 4, wherein the other KRF comprises at least one of the following:

a blueprint database KRF in case the other key field is associated with a ole which is an application type identifier, a dimensioning function KRF or a calendaring function KRF in case the other key field is associated with a role which is an intent calendaring parameter, a deployment function KRF in case the other key field is associated with a role which is an intent deployment parameter, or a dimensioning function KRF in case the other key field is associated with a role which is an intent dimensioning parameter.

6. The apparatus of claim 1, wherein the apparatus is further configured to:

receive a deployment plan of virtual network functions to be used for executing the processing by a lifecycle action KRF.

7. The apparatus of claim 1, wherein the apparatus is further configured to:

in case the key field is associated with a role which is an update of at least a part of the infrastructure, or in case an associated role is an update of at least a part of the infrastructure, wherein the associated role is associated with a key field value of a lifecycle action intent which is composed of a single key field type whose key field value is considered as key field type, with the associated role of infrastructure update, execute the processing by a translation KRF, the processing including translating the key value or the key field value into the one or more instructions for the one or more control functions, and transmitting the one or more instructions to a target function which interfaces with the one or more control functions.

8. The apparatus of claim 1, wherein the apparatus is further configured to:

in case the key field is associated with a role which is an update of a database, or in case an associated role is an update of the database, wherein the associated role is associated with a key field value of a lifecycle action intent which is composed of a single key field type whose key field value is considered as key field type, with the associated role of database update, execute the processing by the database, the processing including updating the database.

9. The apparatus of claim 1, wherein the received intent is identified by a unique intent identifier formed by arranging key values of the key fields of the sequence expressing the received intent; and wherein a status is associated with the unique intent identifier, the status including status values of running, ended, cancelled, scheduled, stalled, aborted.

10. The apparatus of claim 1, wherein
the received intent is identified by an area intent identifier which includes information on an area of the infrastructure, wherein the information is derived from a key value of a key field in the sequence, wherein the key field is of a location type.

11. The apparatus of claim 1, wherein for the received intent a generic intent identifier is generated from key values of specific key fields of the key fields of the sequence and stored in an intent cache.

12. The apparatus of claim 11, wherein for the generic intent identifier the intent cache stores a set of service deployment attributes comprising at least one of the following:
- an updated intent family set of associated intent identifiers comprising the generic intent identifier and a date,
- an associated service graph which comprises one or more sets of so-called virtual network function, VNF, chains, where a VNF chain comprises VNFs connected by directed edges,
- for a VNF chain of the associated service graph, requirements in bandwidth and latency capabilities, or
- for an individual VNF, an associated required budget in cloud resources.

13. A method comprising:
executing a processing with respect to a key value of a key field included in a sequence of one or more key fields expressing a received intent, wherein the received intent is associated with a specific system; and
generating, based on a result of the processing, one or more instructions associated with the specific system for one or more control functions controlling an infrastructure for carrying out the received intent,
wherein the key field is of a key field type of a set of key field types defined in advance,
wherein the key field type has been assigned at least one role of a set of roles defined in advance,
wherein the at least one role has been assigned a type of key field receiving function, KRF, of a set of types of KRFs defined in advance, and
wherein the processing is executed by the type of KRF associated with the at least one role assigned to the key field.

14. The method of claim 13, wherein the processing is executed, with priority, with respect to one or more key fields of the sequence, which are associated with a specific role of the set of roles, wherein the specific role itself is an intent.

15. The method of claim 13, further comprising:
in case the key field is associated with a role which is a lifecycle action intent which is an intent comprising a single key field type whose key field value is considered as key field type, with an associated role of at least infrastructure update or database update, wherein the infrastructure update comprises a change on at least a part of the infrastructure,
executing the processing by a lifecycle action KRF, the processing including sending an output of the processing executed by the lifecycle action KRF to another function which is determined based on the associated role of the key field value of the lifecycle action intent.

16. A non-transitory computer readable medium comprising program instructions for causing an apparatus to perform at least the following:
executing a processing with respect to a key value of a key field included in a sequence of one or more key fields expressing a received intent, wherein the received intent is associated with a specific system; and
generating, based on a result of the processing, one or more instructions associated with the specific system for one or more control functions controlling an infrastructure for carrying out the received intent,
wherein the key field is of a key field type of a set of key field types defined in advance,
wherein the key field type has been assigned at least one role of a set of roles defined in advance,
wherein the at least one role has been assigned a type of key field receiving function, KRF, of a set of types of KRFs defined in advance, and
wherein the processing is executed by the type of KRF associated with the at least one role assigned to the key field.

* * * * *